Oct. 8, 1946.    R. G. KRASBERG    2,409,128
BANDING MEANS
Filed Feb. 25, 1944
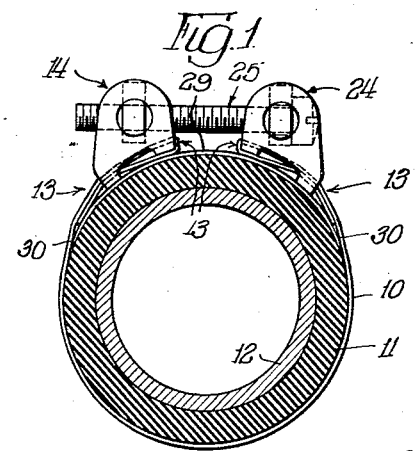
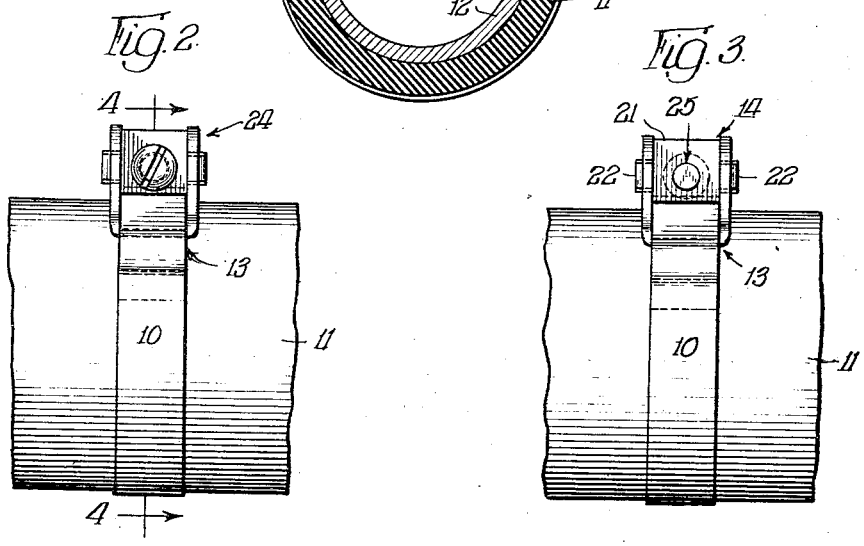
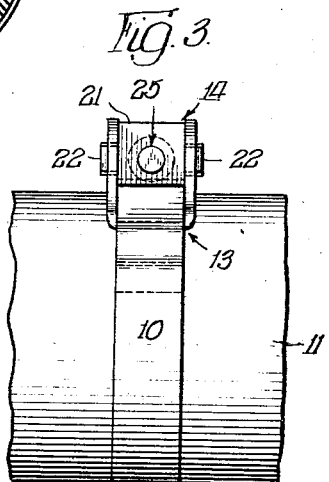
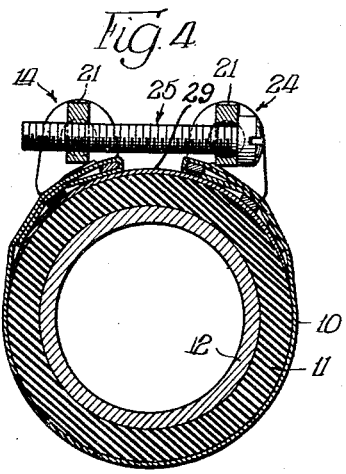
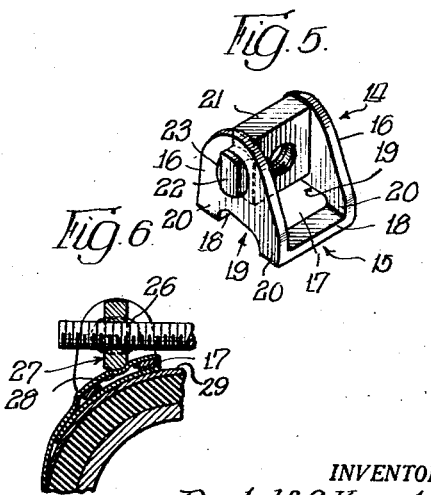
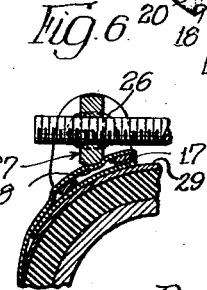
INVENTOR.
Rudolf G. Krasberg,
BY
Cromwell, Greist & Warden
Attys Patented Oct. 8, 1946

2,409,128

UNITED STATES PATENT OFFICE 2,409,128

BANDING MEANS

Rudolf G. Krasberg, Chicago, Ill.

Application February 25, 1944, Serial No. 523,786

5 Claims. (Cl. 24—19)

The present invention relates to improvements in banding means. More particularly, it pertains to a novel type of hose clamp possessing correlated improvements and discoveries whereby the utility of such a clamp is considerably enhanced.

A principal object of the invention is the provision of a clamping means comprising a banding element with end portions terminating in loops and a locking member carried by each of the loops, each locking member having a cross-head mounted therein and connected by suitable means to draw the cross-heads together to constrict the banding element which in turn forces each locking member against the band and object to be clamped.

More specifically, it is an object of the present invention to provide a clamp consisting of a generally circular banding element to place around an object to be clamped, and having at least one end portion terminating in a loop, a locking member carried by the loop and having a base seated against one portion of the loop, the locking member carrying a movably mounted cross-head connected by means of a bolt to a coacting locking member associated with the other end of the banding element, whereby the locking members can be drawn together to constrict the banding element so that the portion of the loop against which the base is seated, and which extends inwardly of the banding element, is secured against the object to be clamped and at the same time binding the locking means immovably in position with respect to the loop and against the clamped object.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is an end elevational view, partly in section, illustrating one arrangement of the clamping means embodying the present invention mounted in clamped position;

Fig. 2 is a front elevational view of the clamp shown in Fig. 1;

Fig. 3 is a rear elevational view of the clamp shown in Fig. 1;

Fig. 4 is a transverse sectional view, similar to Fig. 1, taken along the lines 4—4 of Fig. 2 and looking in the direction of the arrows;

Fig. 5 is a perspective view of a preferred form of locking member; and

Fig. 6 is an end elevational view of a fragmentary portion of a clamping means, partly in section, illustrating a modification of the locking arrangement of the banding element and locking member.

Referring more particularly to the drawing, a banding element 10 is illustrated positioned, for example, around a rubber hose 11 which in turn is fitted over the end of a pipe 12. Preferably, the banding element consists of a strap of metal of suitable width and terminates in loops indicated generally at 13, 13. Preferably, the loops constitute the end portions of the band doubled back upon themselves inwardly of the banding element.

Carried by each loop is a locking member indicated generally at 14 (Fig. 5). This locking member in its most desired form consists of a U-shaped device which essentially consists of a base indicated generally at 15 and upstanding wall portions 16, 16. The base itself is apertured as at 17 so that essentially it consists of bars or bridging pieces 18, 18, connecting the opposed side walls 16, 16. A portion of each side wall also is apertured as at indicated generally at 19 with the result that each side wall at the points where they are connected to the bridging pieces 18, 18 take on the structural appearance of legs 20, 20.

Carried between the side walls of the locking member is a cross-head 21 having trunnions 22 swively mounted in openings 23 provided in the side walls 16, 16. Since there preferably are two of such locking members it is desirable that one of them be threaded as indicated in Fig. 5. The other locking member, indicated generally at 24 need not be so threaded. Preferably, the locking member 24 is identical in construction with that illustrated in Fig. 5, except for the fact that its cross-head need not be screw-threaded, and therefore a description of the structure of such a locking member need not be repeated. It is also within the contemplation of the invention that these coacting locking members need not be identical in construction but that any other suitable form of locking member adapted to coact with one of those illustrated can be used if it performs the equivalent function thereof which is to maintain at least one base of a locking member positioned as indicated and which will permit of the same to be moved in axial alignment with its cooperatively associated locking member.

Both locking members preferably are connected by a locking means such as, for example, a screw-threaded bolt 25 which passes through the unthreaded cross-head and is screwed into the threaded cross-head utilizing the latter as a nut. Of course, neither of the cross heads need be threaded if it is desired to use a bolt with a separate nut.

The looped portions 13 each carry one of the locking members. Preferably, the end of the banding element which provides the loop has one portion thereof which is disposed across the top of the base 15 or bridging pieces 18, 18 of the locking member, passes around the underside thereof around one of the bridging pieces, upwardly through the aperture 17 and thence over and across the other bridging piece 18 under the banding element proper overlying the last named bridging piece to be wedged thereagainst. Preferably, the end of the banding element thereafter extends downwardly and inwardly along the band so as further to be frictionally engaged therewith and the object to be clamped, all as is more fully illustrated in Figs. 1 and 4.

It may be desirable to omit the aperture 17 in the locking member 15, in which case it obviously will be impossible to weave or thread the banding element as above described. Nevertheless, the looped portion 13 can still be utilized in a manner similar to that described by passing one portion of the banding element over the base and passing the remaining portion under a portion of the base, the whole of it, or extending it downwardly similarly to be caught in the nip of the banding element proper and the object to be clamped. Any of these as well as equivalent modifications may be utilized in practicing the present invention but the threaded embodiment above described is most desirable.

In another modification, as illustrated in Fig. 6, the banding element in forming the loop is not passed through the aperture but the latter can be utilized for another purpose. It will be observed that the trunnion of the cross-head is swively or movably mounted in an opening which is not circular as indicated in the modification shown in Fig. 5 but is elongated as indicated at 26. Also, the bottom portion 27 of the cross-head may be somewhat longer than that illustrated in the preferred modification. As the screw is turned relatively to a threaded cross-head, the latter will move in the direction of the aperture 17 and distort that portion of the loop overlying the same and clinch it into the aperture as indicated at 28.

In either modification it may be desirable previously to secure together the overlapping portions of the banding element which forms the loop where they are in face-to-face contact. Particularly is this true in those cases where the looped end is turned outwardly rather than inwardly of the banding element and this may be done by any suitable means such as riveting, spot welding or the like.

Since the cross-heads are swively mounted they can be drawn toward each other without binding and in axial alignment tangentially of the circular band.

While the banding element is intended substantially to encompass the entire article to be clamped there may remain at times a space between the terminating portions thereof. Preferably, in order to avoid any bulging of the materials being clamped when rubber or other flexible material is used, it is desirable to provide the device with an insert 29 the ends 30 of which preferably are tapered. The base of the locking members will come to rest upon the insert, separated therefrom only by the inwardly directed end portion of the banding element which forms the loop. When the screw is finally tightened to draw the cross-heads together the locking members will constrict the banding element, and the portions of the loop against which each base of the locking member is seated will be secured thereby in position against the object to be clamped because of the pressure brought to bear against the base by the portion of the loop which overlies the same.

It will thus be seen that the objects hereinbefore set forth can readily and efficiently be attained and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A clamp, which comprises a banding element adapted substantially to encompass an object to be clamped thereby with end portions terminating in loops, and U-shaped locking members constituting spaced apart substantially parallel upstanding wall members integrally connected to each other by bridging pieces underlying the wall members and providing an apertured base for each of said locking members, one of said bridging pieces on each locking member having its lower surface lying in a plane below said other bridging piece on its locking member with said banding element in the area of each loop secured between said walls of said locking members and carried by each of said loops, each of said locking members having a cross-head swively mounted and connected by a bolt adapted to draw said cross-heads together and to constrict the banding element, said bolt being screw-threaded and one of said cross-heads constituting a nut for said bolt having trunnions journaled in said side walls, each of said locking members overlying an inner portion of its loop and being pressed thereagainst by the remaining overlying portion of the loop to press said inner portion and said locking member into frictional engagement with said object to be clamped.

2. A clamp, which comprises a banding element adapted substantially to encompass an object to be clamped thereby with end portions terminating in loops, and a locking member carried by each of said loops, each of said locking members constituting spaced apart substantially parallel upstanding wall members integrally connected to each other by bridging pieces underlying the wall members and providing an apertured base for each of said locking members, one of said bridging pieces on each locking member having its lower surface lying in a plane below said other other bridging piece on its locking member with said banding element in the area of each loop secured between said walls of said locking members and a cross-head movably mounted therein and connected by a bolt adapted to draw said cross-heads together and constrict the banding element, each of said locking members overlying an inner portion of its loop and being pressed thereagainst by the remaining overlying portion of the loop to press said inner portion and said locking member into friction engagement with said object to be clamped.

3. A clamp, which comprises a banding element adapted substantially to encompass an object to be clamped thereby and having an end portion terminating in a loop, locking members constituting spaced apart substantially parallel upstanding wall members integrally connected to each other by bridging pieces underlying the wall members and providing an apertured base for each of said locking members, one of said bridging pieces on each locking member having its lower surface lying in a plane below said other bridging piece on its locking member with said banding element in the area of each loop secured between said walls of said locking members carried by said loop and having base seated against one portion of the loop, one locking member having a cross-head connected by means of a bolt to the other locking member associated with the other end of said banding element whereby said locking members can be drawn together to constrict said banding element, the portion of the loop against which said base is seated extending inwardly of said banding element and secured thereby against said object to be clamped.

4. A clamp, which comprises a banding element adapted substantially to encompass an object to be clamped thereby and having an end portion terminating in a loop, locking members constituting spaced apart substantially parallel upstanding wall members integrally connected to each other by bridging pieces underlying the wall members and providing an apertured base for each of said locking members, one of said bridging pieces on each locking member having its lower surface lying in a plane below said other bridging piece on its locking member with said banding element in the area of each loop secured between said walls of said locking members and a portion of each loop being threaded through an aperture and secured in overlying position across a top portion of said base by said banding element, said locking members each having a cross-head connected by means of a bolt to the other locking member associated with the other end of said banding element whereby said locking member can be drawn together to constrict said banding element, the portion of each loop which is threaded through said aperture extending inwardly of said banding element and secured thereby against said object to be clamped.

5. A clamp, which comprises a banding element having an end portion terminating in a loop, a locking member having an apertured base carried by said loop and a portion of said loop overlying said aperture, said locking member constituting upstanding wall members connected to each other by bridging pieces which provide said aperture, substantially horizontal openings in said walls carrying a cross-head there-between connected by means of a bolt to a coacting locking member associated with the other end of said banding element whereby said locking members can be drawn together to constrict said banding element, said looped portion overlying said aperture being clinched therein by said cross-head as the latter is moved along said elongated openings upon constriction of the banding element.

RUDOLF G. KRASBERG.